May 30, 1933.    J. T. SHIMMIN ET AL    1,912,228
FLOTATION APPARATUS
Filed Nov. 10, 1927    4 Sheets-Sheet 4
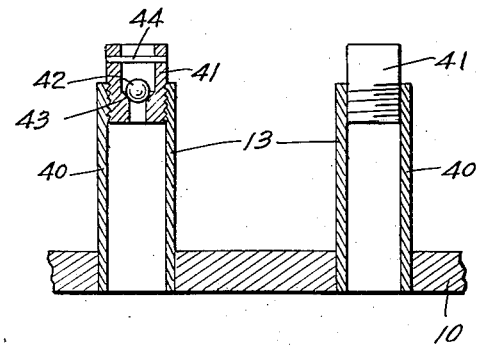
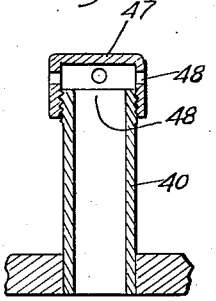
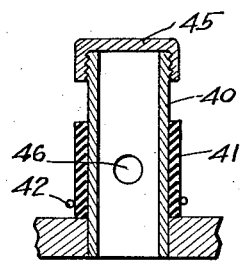
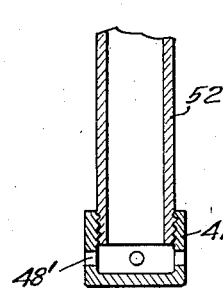
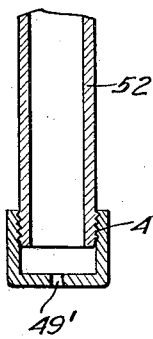
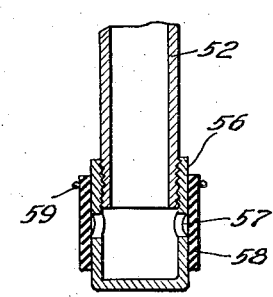
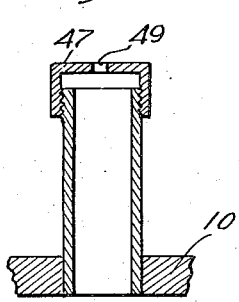
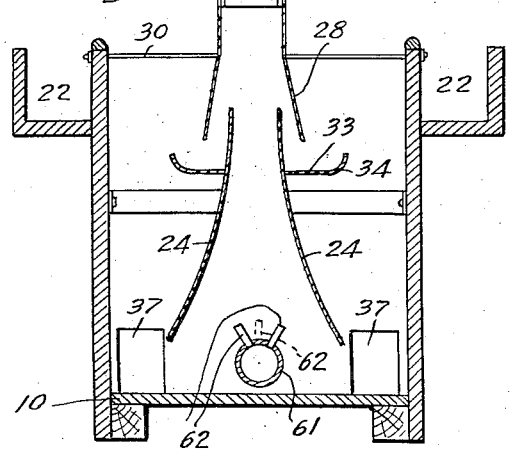
INVENTOR.
John T. Shimmin,
Homer C. Hirsch.
BY Arthur P. Knight and
Alfred W. Knight
ATTORNEYS Patented May 30, 1933

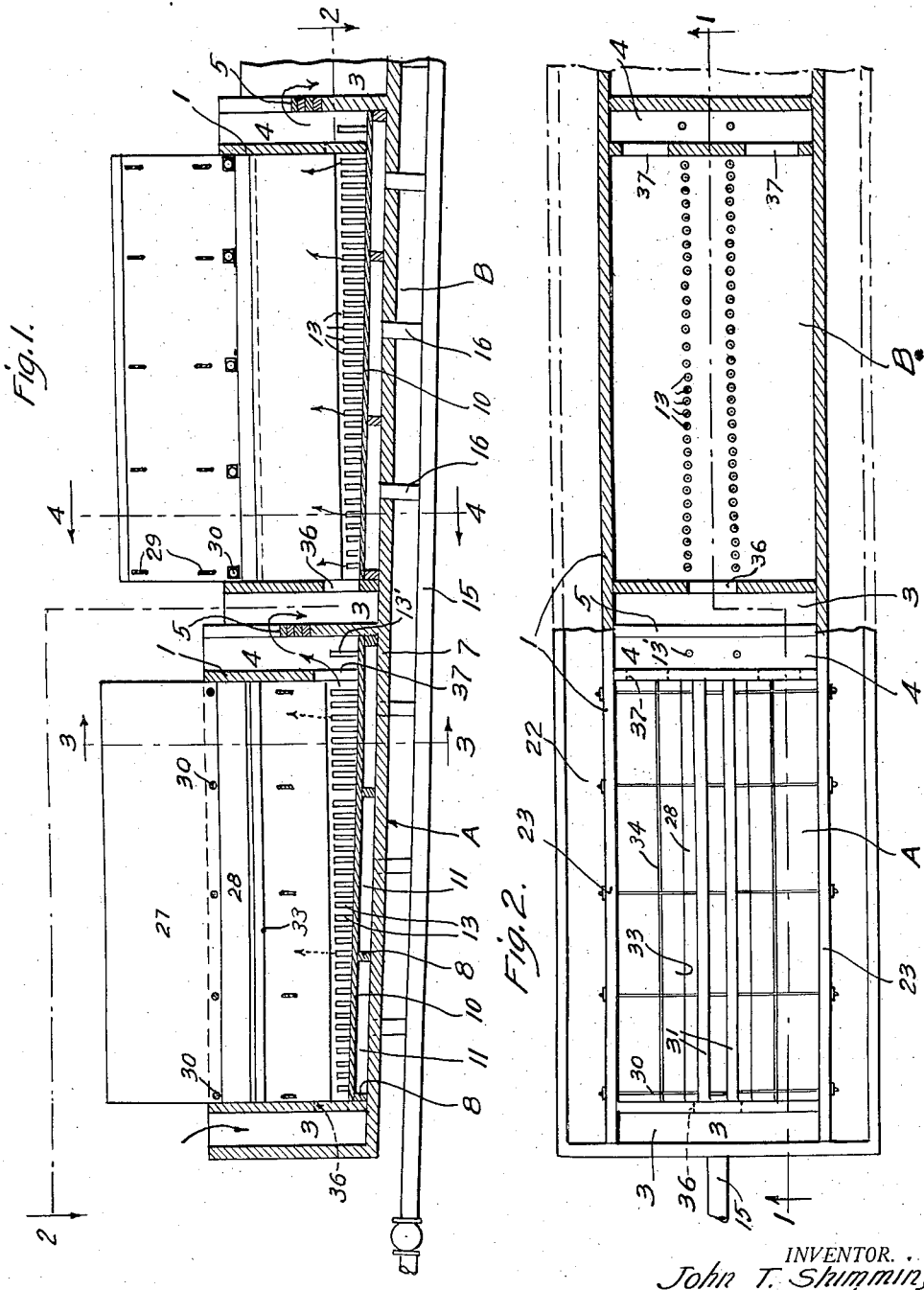

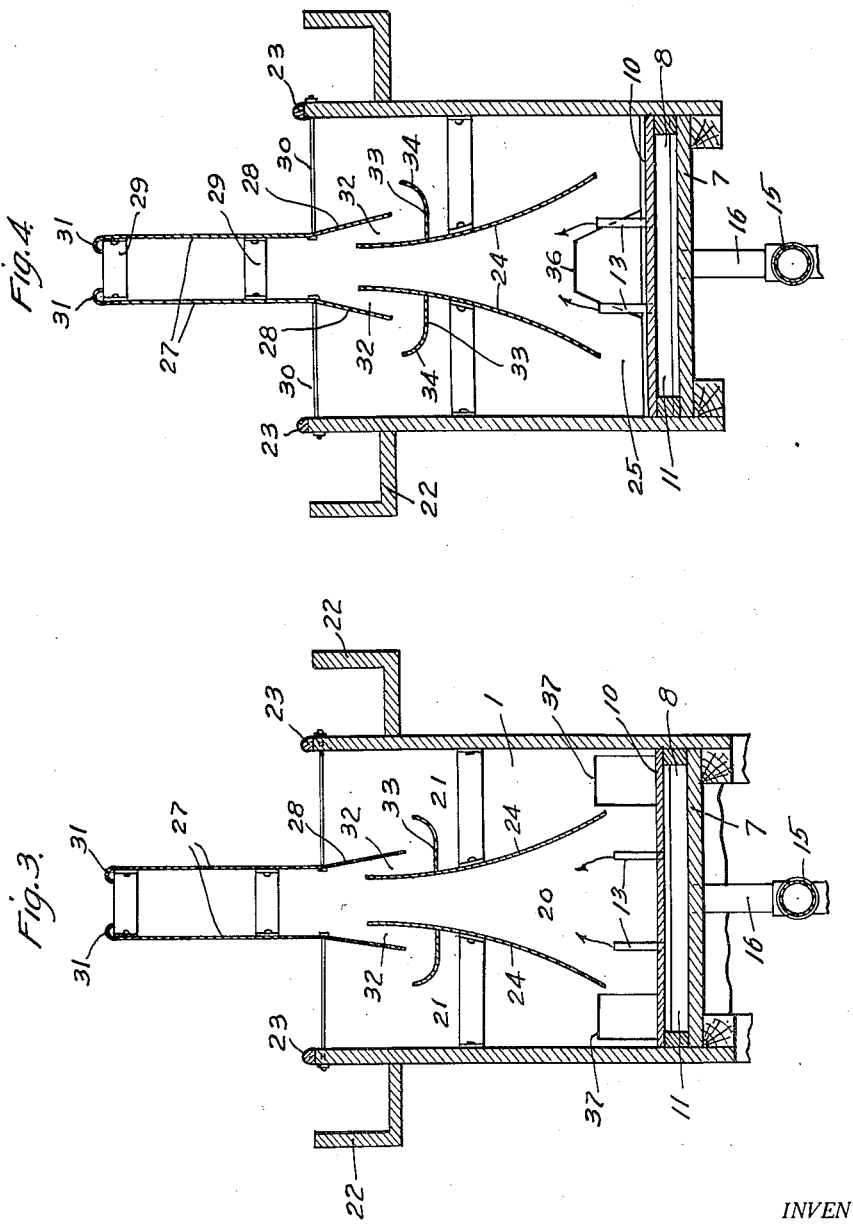

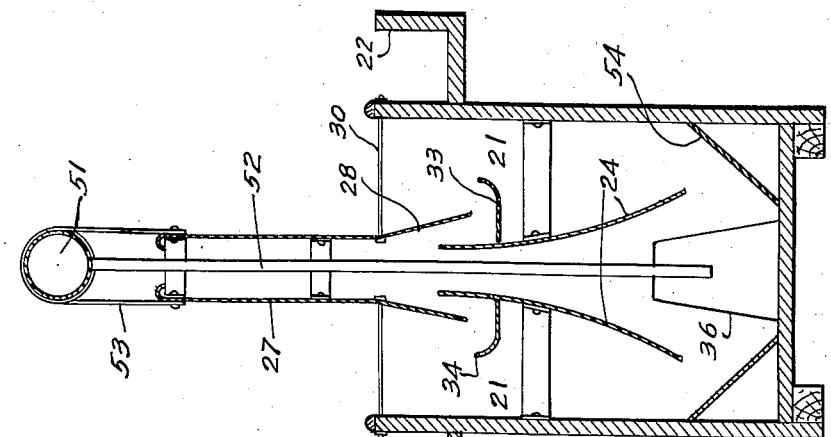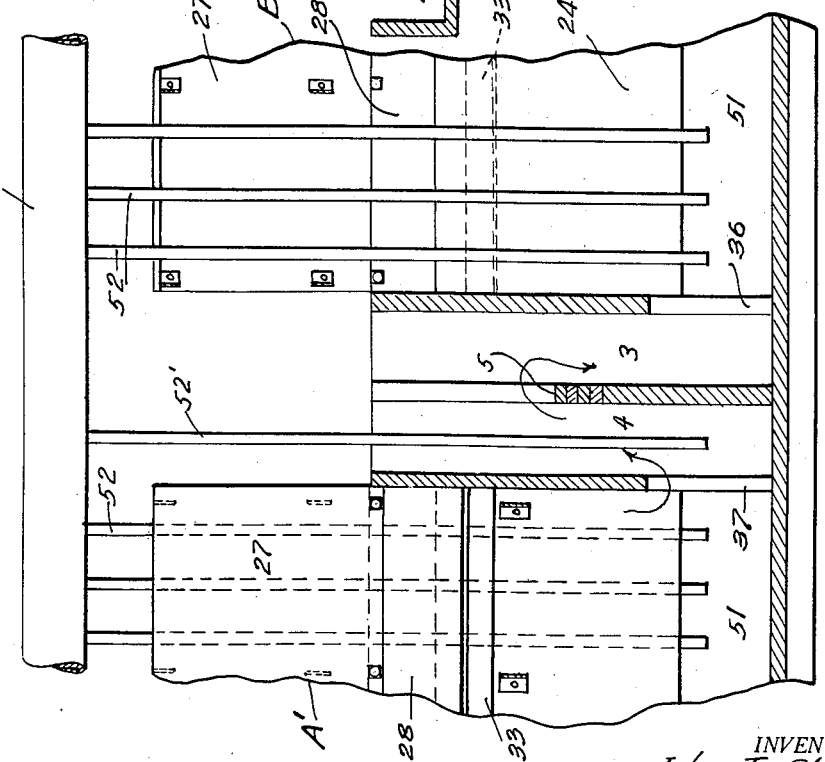

1,912,228

UNITED STATES PATENT OFFICE

JOHN T. SHIMMIN, OF SHERMAN, CALIFORNIA, AND HOMER C. HIRSCH, OF EL PASO, TEXAS

FLOTATION APPARATUS

Application filed November 10, 1927. Serial No. 232,283.

This invention relates to an apparatus for concentration of ores or other materials by the well known flotation process and particularly to an apparatus of what may be termed the "matless" type.

The principal object of our invention is to provide a flotation apparatus of the matless type in which the flotation operation may be effected in the most efficient and economical manner.

A further object of the invention is to provide a flotation apparatus which will require a minimum expenditure of time and money to maintain the same in effective working condition.

A further object of the invention is to provide improved means for transferring the pulp from one flotation cell to the next in a series of cells.

A particular object of the invention is to provide a novel form of aerating means which may be substituted for the porous blanket or mat in a flotation machine of the well known Callow type, so as to improve the efficiency and economy of operation thereof.

Other objects of the invention will appear hereinafter.

The two types of flotation machines heretofore in most common use comprise Callow type machines and mechanical agitation type machines. In the Callow machine, U. S. Patent No. 1,141,377, air is introduced into the material or ore pulp, for effecting the flotation operation, by forcing the air through a porous medium or mat, such as loosely woven canvas. In such machines a considerable pressure is necessary to force the air through the fine pores of the mat, so that from 1 to 3 pounds more pressure per square inch is required than is actually necessary to effect the flotation operation. For this reason these machines are expensive to operate, and furthermore the porous mat tends to become clogged with fine particles from the material being treated so that the air pressure required gradually builds up and it is necessary to thoroughly clean the mats from time to time in order to permit their further use. Also the mats are of limited life and must be replaced at regular intervals.

In the mechanical agitation type machine the air is introduced into the pulp by means of rapidly rotating paddles or similar devices and these machines are also inefficient and expensive in operation.

In machines of the matless type heretofore proposed, which also have been termed air lift machines, such as shown in Welsch Patent No. 1,253,653, the air is introduced into the pulp through open end pipes of relatively large diameter in a compartment known as the agitation or air life compartment. The pressure required is thus reduced to a minimum but the machine is inefficient for other reasons. The walls of the air lift compartment, for example, are vertical and no means are provided for effecting efficient air lifting action so that a large excess of air must be introduced in order to effect flotation.

The flotation machine of our invention is also of the matless type, so that a minimum pressure is required, but the machine is so designed as to provide for maximum effectiveness of aeration in one compartment, which may be the aerating compartment, and maximum effectiveness of separation in another compartment, called the separating compartment. The pulp is repeatedly circulated through these two compartments, and in order to prevent short circuiting or passage of material through the cell without being subjected to such circulation, we prefer to provide for introduction of the pulp at the feed end of the cell into the lower portion of the aerating compartment and for removal of the tailings from each machine at the lower portion of the separating compartment.

The accompanying drawings illustrate embodiments of our invention and the manner in which the same may be applied to flotation cells of the Callow type, and referring thereto:

Fig. 1 is a longitudinal vertical section through two cells of a series taken on line 1—1 in Fig. 2.

Fig. 2 is a partly sectional plan view taken on line 2—2 in Fig. 1.

Fig. 3 is a transverse section on line 3—3 in Fig. 1.

Fig. 4 is a transverse section on line 4—4 in Fig. 1.

Fig. 5 is a partial longitudinal section of two successive cells showing a modified form of means for supplying the air to the lower portion of the aerating compartment.

Fig. 6 is a transverse section on line 6—6 in Fig. 5.

Figs. 7 to 10 inclusive are sectional views of various forms of nozzles on air distributing members for use with the air supply means shown in Figs. 1 to 4 inclusive.

Figs. 11 to 13 inclusive are similar views showing various forms of nozzles or air distributing members for use in the form of the invention shown in Figs. 5 and 6.

Fig. 14 is a transverse section showing another form of air supply means.

In Figs. 1 and 2 two flotation cells or machines A and B are shown as connected in series in the usual manner, it being understood that any desired number of such cells may be connected in similar manner, each cell comprising a box, trough or casing 1 whose side and end walls may be either sloping or vertical. Each cell may be provided with a feed compartment 3 at one end and a discharge compartment 4 at the other end, the material passing over suitable adjustable weirs 5 from the discharge compartment of each machine to the feed compartment of the next machine.

The invention is shown in this case as applied to flotation cells of the Callow type, in which the bottom or floor 7 slopes downward at a greater or less angle in the direction of travel of pulp through the cells as shown. In cells of this type, frame members 8 are secured in position upon the floor 7, and provide means to which the porous mats may be secured and also serve to divide the space between the bottom 7 and such mats into a plurality of air compartments. In this case, however, we have shown the mats as replaced by flat header plates 10, which may be secured to frame members 8 in any suitable manner, said frame members serving as before to divide the space between said plates and the bottom 7 into a plurality of air supply compartments or headers 11. The plates 10 are provided with a plurality of air delivering members or nozzles 13 distributed in the median portion thereof and throughout substantially the entire length of each cell. Said air delivering members are shown as arranged in two parallel rows extending longitudinally of the cell and equidistant from the median line thereof, but may, if desired, be arranged in any other suitable manner. It is essential, however, that such air delivering members be placed only in those portions of plates 10 which are beneath the respective aerating compartments as hereinafter described. On account of the sloping bottom of the flotation cells and the consequent sloping of the plates 10, the air delivering members 13 in each cell are preferably made of increasing heights in the direction of flow of material through the cell so as to bring the air outlet openings at the upper ends of said air delivering members in each cell in substantially the same horizontal plane, and thus permit equal delivery of air therethrough. An air manifold pipe 15 may extend throughout the length of the series of cells and beneath the same, and suitable connecting pipes 16 may be provided for supplying air from such manifold pipe to the respective compartments 11.

Within the box or casing of each cell are provided suitable baffle or partition means for dividing the same into an aerating compartment and a separating compartment or compartments. In the preferred embodiment of our invention as shown in the drawings there is provided an aerating compartment 20 at the central portion of the cell and a separating compartment 21 at each side thereof so as to permit overflow of froth over both side walls 23 of the cell, suitable launder means 22 being provided for receiving and conveying away such froth. It will, of course, be understood, however, that many modifications in the specific arrangement of the aerating and separating compartments may be made without departing from our invention.

The baffle or partition means for dividing the aerating and separating compartments may comprise two partition plates 24 extending throughout the length of each cell and from a position spaced somewhat above the bottom plate 10 upwardly to a position adjacent but preferably somewhat below the level of the upper edges of the side walls. Communication is thus provided below the partition plates, as indicated at 25, between the lower portions of the aerating compartment and the two separating compartments. Said plates 24 converge upwardly throughout substantially the entire height of the aerating compartment so as to provide an aerating compartment whose cross section decreases upwardly and thus cause the pulp to gain in velocity as it rises therein. Furthermore, as shown for example in Fig. 3, the height of said aerating compartment is materially greater than the width thereof.

Two baffle plates 27 are also provided for receiving the aerated material delivered from the upper end of the aerating compartment and deflecting the same downwardly. Said plates 27 also extend throughout the length of each cell and are spaced somewhat apart and are substantially vertical at their upper portions. Their lower portions, however, are preferably flared downwardly and outwardly as indicated at 28 and are spaced a suitable distance from the upper edges of partition plates 24, to provide for communication through passages 32 between the top of the aerating compartment and the separating compartments. Said baffle plates 27 may be secured together and spaced apart by means of spacers or frame members 29 and may be supported from the side walls of the cell by means of supporting rods or bolts 30. The space between plates 27 is preferably opened freely to the air at the top, as indicated at 35, so that no back pressure may be created therein and any excess air rising through the aerating compartment in the form of large bubbles may escape to the atmosphere instead of being forced to enter the separating compartment and disturb the separating operation. Said baffle plates may, however, be advantageously provided with inwardly projecting bent over portions 31 at their upper edges so as to prevent small fragments of pulp from being mechanically carried or blown away.

Baffle plates 33 are also provided extending outwardly from the respective plates 24 and having portions extending substantially horizontally and somewhat beneath the lower edges of baffle plates 27, said plates 33 being preferably bent upward at their outer edges as shown at 34 so as to deflect the pulp upwardly, and cause the same to enter the separating compartment with an upward velocity, thus assisting the rising of the froth to the top of such compartment.

Each cell is shown as provided with an opening 36 establishing communication between feed compartment 3 thereof and the lower portion of the aerating compartment, and with openings 37 establishing communication between the lower portions of the two separating compartments 21 and the discharge compartment 4.

The plate 10 may be extended beneath the discharge compartment 4 of each cell, and air delivering members 13' may also be provided therein, to assist in positive discharge by air lift action, of the tailings from each cell of the next cell in the series.

The air delivering members 13 above referred to may consist simply of short sections of pipes open at their upper ends or may, for example, be of any of the forms shown in Figs. 7 to 10 inclusive. In the form shown in Fig. 7 each of said gas delivering members comprises a section of pipe 40 and a check valve device 41 screwed or otherwise secured in the upper end of said pipe section. Said check valve device may be provided with a ball 42 adapted to rest by gravity against a seat 43 but to be raised from such seat upon application of air pressure, against a suitable stop member 44.

The ball 42 thus not only serves as a check valve to prevent entry of pulp into the air delivering members and the air compartments 11 aforesaid, when the air supply is cut off, but also acts as a nozzle to distribute the air passing through the air delivering member over a greater area and thus increase the effectiveness of such air in aerating and circulating the pulp.

Another form of check valve device is shown in Fig. 8. In this case a solid cap 45 is screwed on to the upper end of pipe section or tubular member 40 and a sleeve 41 of rubber or other resilient material is passed around the pipe and secured in position as by means of a clamping wire 42. The pipe 40 is provided with one or more outlet openings 46 intermediate the height of sleeve 41. Upon application of air pressure within the pipe 40 the air will issue through the openings or opening 46 and expand the resilient sleeve 41 sufficiently to permit such air to escape between the pipe 40 and the upper end of said sleeve and it will be seen that as before the device acts to distribute the air in a more finely divided condition and over a larger area than as though it were permitted to pass freely out of the end of an open pipe. When the air supply is shut off, on the other hand, the resilient sleeve 41 contracts against pipe 40 and acts as a check valve to prevent entry of pulp into the interior of pipe 40.

Another form of nozzle is shown in Fig. 9 and comprises simply a cap 47 screwed on to the upper end of pipe 40 and provided with one or more openings 48 distributed about the sides thereof. The form of nozzle shown in Fig. 10 is substantially the same with the exception that the cap 47 is in this case provided with one or more openings 49 in the top instead of in the sides. Either of the forms of nozzle just described will act to deliver air in divided condition into the pulp, but is not adapted to act as a check valve as are the forms shown in Figs. 7 and 8.

The apparatus shown in Figs. 5 and 6 is substantially the same as that shown in Figs. 1 to 4 with the following exceptions. Instead of introducing the air from a header or manifold extending beneath the flotation cells and providing air supply compartments at the bottom of the cells, such air is introduced through a manifold pipe 51 extending above the cells and provided with a plurality of air supply pipes 52 extending downwardly between baffle plates 27 and 24 and terminating at a level somewhat above the bottom of the cell. The manifold pipe 51 may be mounted upon supporting yokes 53 secured to the baffle plates 27. We have also shown in this case the provision of boards or plates 54 in the bottom corners of the flotation cell and extending throughout substantially the entire length of each cell and inclined downwardly toward the center so as to cause the material settling in the separating compartment to be delivered into the bottom of the aerating compartment and thus be again subjected to agitation and aeration. This facilitates the circulation of the material and tends to prevent accumulation of settled material along the sides of the bottom portion of the cell. Similar inclined boards or plates may, if desired, be provided in connection with the form of the invention shown in Figs. 1 to 4.

An air delivering pipe 52′ may also extend down to near the bottom of the discharge compartment 4 of each cell for the purpose of air lifting the tailings therefrom into the next cell.

In these figures the two cells A′ and B′ are shown as arranged on the same level, and the bottom 7 of the cells is also shown as extending horizontally instead of being inclined as in the first form shown. It will be understood that any of the forms of air supply means shown may be used in conjunction with either flat bottom or sloping bottom cells.

The air supply pipes 52 may simply be open at their lower ends or may be provided with any suitable type of nozzle or outlet means, for example, as shown in Figs. 11 to 13 inclusive. The nozzles shown in Figs. 11 and 12 are similar to those shown in Figs. 9 and 10 respectively and comprise cap members 47′ having an opening or openings either at the sides as indicated at 48′ in Fig. 11 or at the bottom as indicated at 49′ in Fig. 12. The nozzle shown in Fig. 13 is similar to that shown in Fig. 8 and comprises a cap member 56 screwed on the lower end of pipe or tubular member 52 and provided with opening 57, and a sleeve 58 formed of rubber or other resilient material secured over said openings as by means of wire 59. Said wire may be secured either at the top of sleeve 58 as shown, so as to cause the air to issue around the bottom of sleeve 58, or at the bottom of said sleeve, so as to cause the air to issue at the top thereof, and the same is likewise true of the nozzle shown in Fig. 8.

Another form of air supply means is shown in Fig. 14, comprising a header or manifold pipe 61 extending throughout the length of the cell and centrally therein and just above the bottom, and a plurality of nozzles or air distributing members 62, which may, for example, be of any of the forms shown in Figs. 7 to 10 inclusive. Such nozzles may extend in any suitable direction, for example, either radially with respect to pipe 61 as shown, or vertically. Furthermore, there may be two rows of such outlet members as shown, or said outlet members may be arranged in any desired number of rows.

The operation of the flotation apparatus of any of the types above described is as follows. The pulp to be treated, and consisting, for example, of a suspension of ground ore or other material in water, together with any desired flotation or frothing agents, is introduced into the first cell through feed compartment 3 and passes thence through the opening 36 into the aerating compartment thereof. The proper pulp level is maintained by adjusting the height of weir 5 at the discharge end of each cell. Air is introduced into the pulp at the bottom of the aerating compartment through any of the air delivering means above described and the air so introduced forms fine bubbles in the pulp and thoroughly agitates the same. An air lift action takes place, the pulp being raised upwardly between plates 24 into the space between the lower portions of baffle plates 27 and to a level at or near the froth overflow level, and then passing downwardly at both sides through the passages 32 between the plates 24 and the deflecting portions 28 of baffles 27. The pulp is again reversed in direction and deflected upwardly by the upwardly curved portions 34 of baffles 33 so that the pulp enters the separating compartment with an initial upward velocity.

It will be seen that due to the upward convergence of plates 24 the upward velocity of the pulp in the aerating compartment is continually increased, and this increasing velocity gives an efficient air lifting action and also causes the formation of a froth. This froth formation is also assisted by the repeated changes of direction of flow caused by baffle means 28 and 33.

In the separating compartment a selective froth containing the valuable portions of the ore or other material rises to the surface where it flows over the upper edges of the side walls 23 and into the launders 22. Due to the continual lifting of material in the aerating compartment, a downward current is induced in the separating compartments and the balance of the ore pulp or other material is thus caused to flow back into the bottom of the aerating compartment. Continuous circulation is thereby maintained and the pulp is subjected to repeated circulations upwardly in the aerating compartment and downwardly in the separating compartments during its pasage through each cell, a certain portion of the valuable constituents being separated in the form of a froth during each such circulation.

The tailings from each cell pass through openings 37 into discharge compartment 4, and hence over weir 5 into the feed compartment of the next cell, in which the same action is carried out. It will be seen that the pulp is introduced into the aerating compartment of each cell at one end and the tailings are removed from the separating compartments thereof at the other end, and as there is a steady flow of material from the separating compartments into the bottom of the aerating compartment throughout the length of the cell, it is impossible for any material to "short-circuit" the cell, that is to pass therethrough without being circulated at least once through the aerating and separating compartments.

It will also be seen that the delivery of air into the material in the discharge compartment, by means of delivery members 13' or 52', produces an air lift action which materially assists in conveying all of the tailings into the next cell. Without this air lift action at this point, some of the heavier portions of the tailings are apt to accumulate at the bottom of the discharge compartment.

We claim:

1. A flotation apparatus comprising a cell having a feed compartment at one end and a discharge compartment at the other end and froth overflow means extending along a longitudinal side thereof, partition means extending lengthwise of said cell and defining an aerating compartment and a separating compartment within said cell, while permitting communication between said aerating and separating compartments above and below said partition means, means for delivering air distributed throughout the length of said aerating compartment and at the lower portion thereof, the end walls of said cell serving respectively to entirely prevent direct communication between the feed compartment and the separating compartment and between the discharge compartment and the aerating compartment, opening means in one of said end walls establishing communication between said feed compartment and the adjacent end of said aerating compartment and opening means in the other end wall establishing communication between the discharge compartment and the adjacent end of said separating compartment.

2. A flotation apparatus comprising a casing, partition means extending throughout the length of said casing and defining an aerating compartment and a separating compartment within said casing while leaving an opening for passage of material from the lower portion of said separating compartment into the lower portion of said aerating compartment, means for delivering air in distributed manner to the lower portion of said aerating compartment, a baffle plate extending throughout the length of said casing and spaced from said partition means at the other side of said partition means from said aerating compartment so as to provide a passage for flow of material from the top of said aerating compartment over the top of said partition means and downwardly between said partition means and said baffle plate, and additional baffle member extending throughout the length of said casing and beneath the lower edge of said first named baffle plate, said last named baffle member being formed to deflect material flowing downwardly between said partition means and said first named baffle plate and deliver the same in an upward direction into said separating compartment.

3. In a flotation apparatus, a casing, a partition plate extending throughout the length of said casing and having its lower edge spaced somewhat above the bottom of said casing, a baffle plate extending throughout the length of said casing and spaced from said partition plate and extending from a position somewhat above the upper edge of said partition plate to a position below said upper edge, and a second baffle plate extending outwardly from said partition plate and substantially horizontally beneath and spaced from the lower edge of said first named baffle plate.

4. An apparatus as set forth in claim 3, said last named baffle plate having an upwardly curved portion at its outer edge beyond the bottom of said first named baffle plate.

5. In a flotation apparatus, means defining a cell, baffle means extending within said cell to divide the same into an aerating compartment and a separating compartment while permitting flow of material from the lower portion of the separating compartment to the lower portion of the aerating compartment and from the upper portion of the aerating compartment to the upper portion of the separating compartment, said cell having its bottom inclined downwardly from one end of the cell to the other, air supply means extending adjacent the bottom of said aerating compartment and throughout substantially the entire length thereof and similarly inclined, and a plurality of air delivering members distributed throughout the length of said aerating compartment and connected to said air supply means and opening into said aerating compartment, said air delivering members being of increasing height in the direction of downward inclination of the bottom of the cell so that the air outlet openings of all of said air delivering members lie substantially in the same horizontal plane.

6. A flotation apparatus comprising a cell having a bottom wall and side walls, a header plate spaced above the bottom of said cell to provide an air compartment between said header plate and said bottom wall, means for supplying air to said compartment, a plurality of air delivering members mounted on said header plate and serving to deliver air from said air compartment upwardly into the cell above said plate, said header plate being inclined downwardly from one end of the cell toward the other and said air delivering members being of increasing height in the direction of such downwardly inclination so that the air outlet openings of said air delivering members are all in substantially the same horizontal plane, and baffle means disposed within said cell above said header plate and dividing said cell into an aerating compartment extending above said air delivering members and a separating compartment extending beside said aerating compartment while permitting flow of material from said separating compartment into the bottom of said aerating compartment and form the top of said aerating compartment into said separating compartment.

In testimony whereof we have hereunto subscribed our names this 27th day of October 1927.

JOHN T. SHIMMIN.
HOMER C. HIRSCH.